3,354,149
5β,6β-CYCLO-19-NOR-Δ⁹⁽¹⁰⁾-ANDROSTENES AND PREGNENES AND PROCESS THEREFOR
John A. Edwards, Palo Alto, Calif., assignor to Syntex Corporation, Panama, Panama, a corporation of Panama
No Drawing. Filed Jan. 5, 1965, Ser. No. 423,567
22 Claims. (Cl. 260—239.55)

This invention relates to a novel process for the preparation of cyclopentanopolyhydrophenanthrene derivatives, and to certain novel cyclopentanopolyhydrophenanthrene derivatives prepared thereby.

More particularly, this invention relates to a novel process for the preparation of B-homo-19-nor-Δ⁵⁽¹⁰⁾-steroids of the androstane and pregnane series, such as, for example, those disclosed in my copending U.S. patent application Ser. No. 423,566, filed on Jan. 5, 1965.

The novel compounds of the present invention are represented by the following formulas:

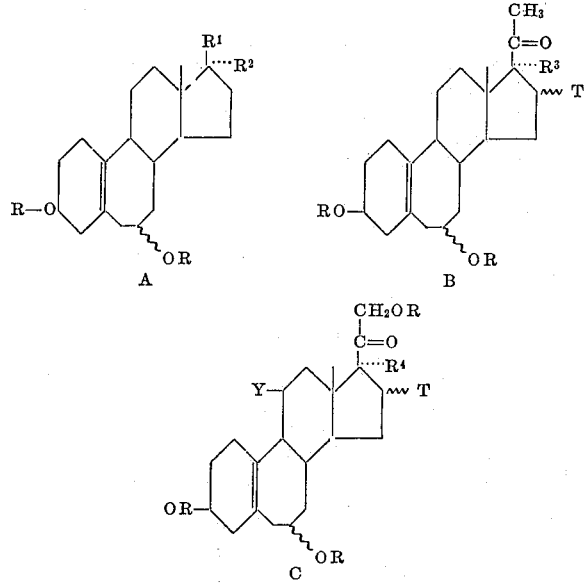

The novel process of the present invention provides these B-homo steroids in admixture with the corresponding novel 5β,6β-cyclo-19-nor-Δ⁹⁽¹⁰⁾-androstenes and -pregnenes, such as those represented by the general formulas:

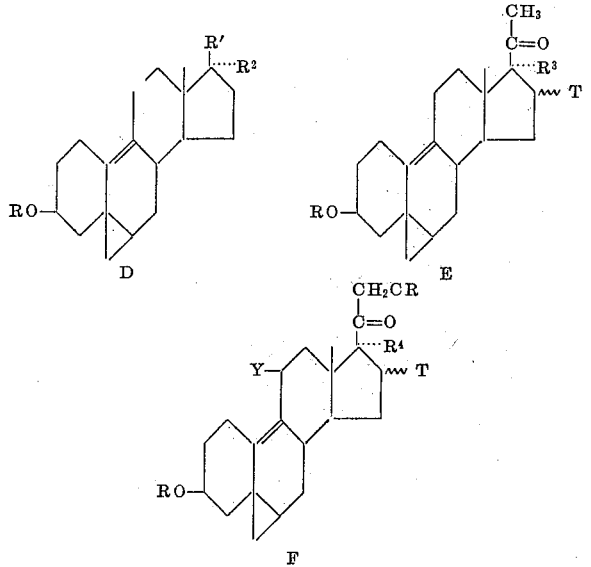

This invention further relates to the novel 5,6-cyclo steroids per se.

In the above formula R represents hydrogen or an acyl group, $R^1$ represents a hydroxyl group or an acyloxy group; $R^2$ represents hydrogen, a lower alkyl (including cycloalkyl) group, such as methyl, ethyl, propyl, cyclopropyl, butyl, cyclobutyl, and the like, a lower alkenyl group, such as vinyl and the like, or a lower alkynyl group, such as ethynyl, propynyl, hexynyl, and the like, containing less than 8 carbon atoms, $R^1$ and $R^2$ taken together represent a keto group; $R^3$ represents hydrogen, a hydroxyl group or an acyloxy group; $R^4$ represents a hydroxyl group; R at the 21-position in Formula III and VI, taken together with $R^4$ and the 20-keto group, can represent a bismethylenedioxy grouping; T represents hydrogen, α-methyl, β-methyl, α-hydroxy or α-acyloxy; $R^3$ and $R^4$ taken together with T, can represent the grouping:

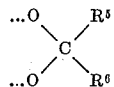

wherein $R^5$ represents hydrogen or a lower alkyl group and $R^6$ represents hydrogen, a lower alkyl group or an aryl (including alkaryl and aralkyl) group containing up to 8 carbon atoms inclusive, such as phenyl, tolyl, xylyl, benzyl, and the like; Y represents hydrogen, β-hydroxy of a keto group. The symbol ⌇ indicates that the hydroxyl group at the 7-position in the above-described B-homo steroids can have either the α- or β-configuration.

The acyl and acyloxy groups referred to herein are preferably derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel process of the present invention can be represented schematically as follows, using, for the sake of simplicity, only the A and B rings of the steroid nucleus:

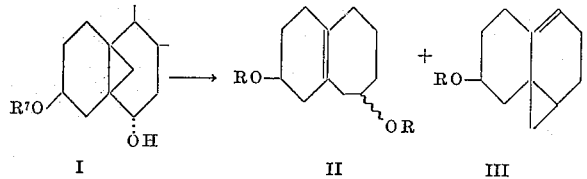

In these formulas R has the same meaning as set forth hereinabove for Formulas (A)-(F), and $R^7$ represents an acyl group.

The starting materials I, i.e., 5,19-cyclo-6α-hydroxyandrostanes and -pregnanes having no unsaturation in their cyclopentanopolyhydrophenanthrene ring structures (rings A, B, C and D), employed in the novel process of the present invention are obtained as described in my aforementioned copending U.S. patent application Ser. No. 423,566, filed Jan. 5, 1965.

The starting material will preferably have any free hydroxyl groups present, other than the one attached to the 6-carbon atom or an 11β-hydroxyl group, esterified with an acyl group derived from a hydrocarbon carboxylic acid containing less than 12 carbon atoms. In addition, in the case of the 17α,21-dihydroxypregnanes, the hydroxyl groups at the 17- and 21-positions, together with the 20-keto group, can be converted to a bismethylenedioxy grouping, while pregnanes having 16α- and 17α-hydroxyl groups can also be converted to the corresponding isoalkylidenedioxy derivatives.

In practicing the novel process of the present invention, the starting steroid, I, e.g., 5,19-cyclopregnane-3β,6α-diol-20-one 3-acetate (I; R⁷=acetyl), is contacted under aqueous conditions with a proton donor, preferably an aqueous solution containing from about 10% to about 25% by weight, based on the total weight of the solution, of a strong mineral acid, such as sulfuric, hydrofluoric or perchloric acid, or a strong organic acid, such as trifluoroacetic or p-toluenesulfonic acid, and the like, in an inert organic solvent, e.g., a ketone such as acetone, methyl ethyl ketone, diethyl ketone or methyl isobutyl ketone, an ether such as dioxane, tetrahydrofuran or diglyme, and the like, as well as mixtures thereof, to provide a mixture of the corresponding B-homo-19-nor-$\Delta^{5(10)}$-steroid 7-ols(II), e.g., B-homo - 19 - nor - $\Delta^{5(10)}$-pregnene-3β,7(α and β)-diol-20-one 3-acetate (II; R=acetyl) and 5β,6β-cyclo-19-nor-$\Delta^{9(10)}$-steroid (III), e.g., 5β,6β-cyclo-19-nor-$\Delta^{9(10)}$-pregnen-3β-ol - 20 - one 3 - acetate (III; R=acetyl).

This reaction will generally be carried out at a temperature ranging from about 0° C. to about 50° C., and preferably at room temperature (about 25° C.), for from about 5 to about 24 hours, and the amount of proton donor employed will usually range from about 5% to about 25% by weight, based on the total weight of solvent (water plus inert organic solvent) present.

Either before or after chromatographic separation of the thus-obtained mixture to give the individual B-homo-7-ols and the 5,6-cyclo steroid, the 3-acyloxy group, and any other ester groups present in the molecule, can be hydrolyzed using conventional techniques, e.g., refluxing with aqueous methanolic potassium hydroxide or potassium carbonate, to give the corresponding free hydroxyl-containing compounds. The latter can then be re-esterified, if desired, to introduce a different ester group into the molecule.

Similarly, isopropylidenedioxy and bismethylenedioxy steroids can be converted to the corresponding free hydroxyl compounds at this point in known manner, e.g., by heating with aqueous concentrated formic acid.

As will be readily apparent to those skilled in the art, the particular reaction conditions given hereinabove for carrying out the novel process of the present invention, other than the requirement that the reaction be carried out under aqueous conditions, i.e., reaction temperatures, reaction times, etc., are not critical, inasmuch as, for example, higher reaction temperatures coupled with shorter reaction times, lower reaction temperatures coupled with longer reaction times, pressures above or below atmospheric and the like, can be employed. Thus, the conditions given hereinabove merely represent the best mode of carrying out the novel process of the present invention known at the present time.

The novel 5β,6β-cyclo-19-nor-$\Delta^{9(10)}$ - androstenes of formula D hereinabove wherein R² is other than lower alkynyl are anabolic-androgenic agents having a favorable anabolic/androgenic ratio. In addition, they have anti-estrogenic, anti-gonadotrophic, anti-fibrillatory and appetite-stimulating properties, relieve premenstrual tension, lower blood cholesterol levels, and suppress the output of the pituitary gland.

The novel 5β,6β - cyclo - 19 - nor-$\Delta^{9(10)}$-pregnenes of formula E hereinabove, as well as the novel 5β,6β-cyclo-19-nor-$\Delta^{9(10)}$-androstenes of formula D wherein R² is lower alkynyl, are progestational agents. They also have anti-androgenic, anti-gonadotrophic and anti-estrogenic properties and are useful in fertility control. In addition, they can be used in treating premenstrual tension and exhibit blood cholesterol-lowering and diuretic activities.

The novel 5β,6β-cyclo-19-nor-$\Delta^{9(10)}$ - pregnenes represented by formula F hereinabove are cortical hormones having anti-inflammatory activity, and can be used topically in the treatment of skin disorders such as psoriasis and allergic dermatitis. They also have anti-androgenic, anti-gonadotrophic and anti-estrogenic activity.

In order that those skilled in the art can more fully understand the present invention, the following examples are set forth. These examples are given solely for the purpose of illustrating the invention, and should not be considered as expressing limitations unless so set forth in the appended claims:

*Example I*

To a solution of 2.8 grams of 5,19-cyclopregnane-3β,6α-diol-20-one 3-acetate in 200 ml. of dioxane there were added 70 ml. of aqueous 30% sulfuric acid, and this reaction mixture was allowed to stand at room temperature for 2½ hours. Following this reaction period, the reaction mixture was poured into an aqueous saturated sodium chloride solution, and the resulting solution was extracted with ethyl acetate. The resulting extract was dried over anhydrous sodium sulfate and then chromatographed on alumina to give separately 5β,6β-cyclo-19-nor-$\Delta^{9(10)}$-pregnen-3β-ol-20-one 3-acetate, B-homo-19-nor-$\Delta^{5(10)}$-pregnene-3β,7α-diol-20-one 3-acetate and B-homo-19-nor-$\Delta^{5(10)}$-pregnene-3β,7β-diol-20-one 3-acetate.

By repeating this procedure in every detail but one, namely, replacing, 5,19-cyclopregnane-3β,6α-diol-20-one 3-acetate with the following 5,19-cyclosteroids:

5,19-cycloandrostane-3β,6α-diol-17-one 3-acetate;
17α-methyl-5,19-cycloandrostane-3β,6α,17β-triol 3,17-diacetate;
17α-vinyl-5,19-cycloandrostane-3β,6α,17β-triol 3,17-diacetate;
17α-ethynyl-5,19-cycloandrostane-3β,6α,17β-triol 3,17-diacetate;
5,19-cyclopregnane-3β,6α,17α-triol-20-one 3,17-diacetate;
16β-methyl-5,19-cyclopregnane-3β,6α-diol-20-one 3-acetate;
16α-methyl-5,19-cyclopregnane-3β,6α,17α-triol-20-one 3,17-diacetate;
17,20;20,21-bismethylenedioxy-5,19-cyclopregnane-3β,6α-diol 3-acetate;
17,20;20,21-bismethylenedioxy-16α-methyl-5,19-cyclopregnane-3β,6α-diol 3-acetate;
17,20;20,21-bismethylenedioxy-16β-methyl-5,19-cyclopregnane-3β,6α-diol 3-acetate;
17,20;20,21-bismethylenedioxy-5,19-cyclopregnane-3β,6α-diol-11-one 3-acetate;
17,20;20,21-bismethylenedioxy-16α-methyl-5,19-cyclopregnane-3β,6α,11β-triol 3-acetate and
17,20;20,21-bismethylenedioxy-16β-methyl-5,19-cyclopregnane-3β,6α-diol-11-one 3acetate;

respectively, the corresponding 5,6-cyclo and B-homo steroids, namely,

5β,6β-cyclo-19-nor-$\Delta^{9(10)}$-androsten-3β-ol-17-one 3-acetate;
17α-methyl-5β,6β-cyclo-19-nor-$\Delta^{9(10)}$-androstene-3β,17β-diol 3,17-diacetate;
17α-vinyl-5β,6β-cyclo-19-nor-$\Delta^{9(10)}$-androstene-3β,17β-diol 3,17-diacetate;
17α-ethynyl-5β,6β-cyclo-19-nor-$\Delta^{9(10)}$-androstene-3β,17β-diol 3,17-diacetate;
5β,6β-cyclo-19-nor-$\Delta^{9(10)}$-pregnene-3β,17α-diol-20-one 3,17-diacetate;
16β-methyl-5β,6β-cyclo-19-nor-$\Delta^{9(10)}$-pregnen-3β-ol-20-one 3-acetate;
16α-methyl-5β,6β-cyclo-19-nor-$\Delta^{9(10)}$-pregnene-3β,17α-diol-20-one 3,17-diacetate;
17,20;20,21-bismethylenedioxy-5β,6β-cyclo-19-nor-$\Delta^{9(10)}$-pregnen-3β-ol 3-acetate;
17,20;20,21-bismethylenedioxy-16α-methyl-5β,6β-cyclo-19-nor-$\Delta^{9(10)}$-pregnene-3β-ol 3-acetate;
17,20;20,21-bismethylenedioxy-16β-methyl-5β,6β-cyclo-19-nor-$\Delta^{9(10)}$-pregnen-3β-ol 3-acetate;
17,20;20,21-bismethylenedioxy-5β,6β-cyclo-19-nor-$\Delta^{9(10)}$-pregnene-3β-ol-11-one 3-acetate;
17,20;20,21-bismethylenedioxy-16α-methyl-5β,6β-cyclo-19-nor-$\Delta^{9(10)}$-pregnene-3β,11β-diol 3-acetate;

17,20;20,21-bismethylenedioxy-16β-methyl-5β,6β-cyclo-19-nor-Δ$^{9(10)}$-pregnen-3β-ol-11-one 3-acetate;
B-homo-19-nor-Δ$^{5(10)}$-androstene-3β,7(α and β)-diol-17-one 3-acetate;
B-homo-17α-methyl-19-nor-Δ$^{5(10)}$-androstene-3β,7(α and β),17β-triol 3,17-diacetate;
B-homo-17α-vinyl-19-nor-Δ$^{5(10)}$-androstene-3β,7(α and β),17β-triol 3,17-diacetate;
B-homo-17α-ethynyl-19-nor-Δ$^{5(10)}$-androstene-3β,7(α and β),17β-triol 3,17-diacetate;
B-homo-19-nor-Δ$^{5(10)}$-pregnene-3β,7(α and β),17α-triol-20-one 3,17-diacetate;
B-homo-16β-methyl-19-nor-Δ$^{5(10)}$-pregnene-3β,7(α and β)-diol-20-one 3-acetate;
B-homo-16α-methyl-19-nor-Δ$^{5(10)}$-pregnene-3β,7(α and β) 17α-triol-20-one 3,17-diacetate;
B-homo-17,20;20,21-bismethylenedioxy-19-nor-Δ$^{5(10)}$-pregnene-3β,7(α and β)-diol 3-acetate;
B-homo-17,20;20,21-bismethylenedioxy-16α-methyl-19-nor-Δ$^{5(10)}$-pregnene-3β(α and β)-diol 3-acetate;
B-homo-17,20;20,21-bismethylenedioxy-16β-methyl-19-nor-Δ$^{5(10)}$-pregnene-3β,7(α and β)-diol 3-acetate;
B-homo-17,20;20,21-bismethylenedioxy-19-nor-Δ$^{5(10)}$-pregnene-3β,7(α and β)-diol-11-one 3-acetate;
B-homo-17,20;20,21-bismethylenedioxy-16α-methyl-19-nor-Δ$^{5(10)}$-pregnene-3β,7(α and β),11β-triol 3-acetate and
B-homo-17,20;20-21-bismethylenedioxy-16β-methyl-19-nor-Δ$^{5(10)}$-pregnene-3β,7(α and β)-diol-11-one 3-acetate;

respectively, were obtained as separate chromatographic fractions.

*Example II*

A solution of 2 grams of 5,19-cycloandrostane-3β,6α,17β-triol 3,17-diacetate in 50 ml. of dioxane was admixed with 5 ml. of aqueous 40% hydrofluoric acid, and this reaction mixture was worked up in the manner described 20° C. for 5 hours. Following this reaction period the reaction mixture was worked up in the manner described in Example I hereinabove, thus giving 5β,6β-cyclo-19-nor-Δ$^{9(10)}$-androstene-3β,17β-diol 3, 17-diacetate, B-homo-19-nor-Δ$^{9(10)}$-androstene-3β,7α,17β-triol 3,17 - diacetate and B-homo-19-nor-Δ$^{9(10)}$-androstene-3β,7β,17β-triol 3,17-diacetate as separate chromatographic fractions.

This procedure was then repeated in every detail except for the following. First of all, 5,19-cycloandrostane-3β,6α,17β-triol 3,17-diacetate was replaced by 16α-methyl-5,19-cyclopregnane - 3β,6α, 11β-triol 3 - acetate, isopropylidenedioxy - 5,19 - cyclopregnane-3β,6α-diol-20-one 3-acetate and 17,20;20,21-bismethylenedioxy-5,19-cyclopregnane - 3β,6α,--β-triol 3-acetate, respectively. Secondly, the hydrofluoric acid was replaced by equivalent amounts of aqueous 10% perchloric acid, 10% trifluoroacetic acid and 10% p-toluenesulfonic acid, respectively. In each case, the corresponding 5,6-cyclo and B-homo steroids, namely, 16α-methyl-5β,6β-cyclo-19-nor-Δ$^{9(10)}$-pregnen-3β-ol-20 - one 3-acetate; 16α,17α-isopropylidene dioxy-5β,6β-cyclo-19-nor-Δ$^{9(10)}$-pregnen - 3β - ol - 20-one 3-acetate; 17,20;20,21-bismethylenedioxy - 5β,6β-cyclo-19-nor-Δ$^{9(10)}$-pregnene-3β,11β-diol - 3-acetate; B-homo-16α-methyl-19-nor-Δ$^{5(10)}$-pregnene-3β,7(α and β)-diol-20-one 3-acetate; B-homo-16α,17α-isopropylidenedioxy-19-nor-Δ$^{5(10)}$-pregnene - 3β,7(α and β)-diol-20-one 3-acetate and B-homo - 17,29;20,21-bismethylenedioxy - 19-nor-Δ$^{5(10)}$-pregnene-3β,11β-diol 3-acetate, respectively, were obtained.

*Example III*

A solution of 1 gram of 5β,6β-cyclo-19-nor-Δ$^{9(10)}$-pregnen-3β-ol-20-one 3-acetate in 50 cc. of methanol was admixed with 500 mg. of potassium hydroxide dissolved in 1 cc. of water, and the resulting reaction mixture was refluxed for three hours. Following this reaction period the reaction mixture was poured into ice water and the resulting precipitate was collected by filtration, washed with water until neutral, and then dried. Recrystallization from methanol gave 5β,6β-cyclo-19-nor-Δ$^{9(10)}$-pregnen-3β-ol-20-one.

By repeating this procedure in every detail but one, namely, replacing 5β,6β-cyclo-17-nor-Δ$^{9(10)}$-pregnen-3β-ol-20-one 3-acetate with the remaining 5,6-cyclo steroids prepared as described in Example I and II hereinabove (with the exception of 5β,6β-cyclo-19-nor-Δ$^{9(10)}$-pregnene-3β,17α-diol-20-one 3,17-diacetate and 16α-methyl-5β,6β-cyclo-19-nor-Δ$^{9(10)}$-pregnene-3β,17α-diol-20-one 3,17- diacetate), the corresponding free hydroxy steroids, namely, 5β,6β-cyclo-19-nor-Δ$^{9(10)}$-androsten-3β-ol-17-one;
5β,6β-cyclo-19-nor-Δ$^{9(10)}$-androstene-3β,17β-diol;
17α-methyl-5β,6β-cyclo-19-nor-Δ$^{9(10)}$-androstene-3β,17β-diol;
17α-vinyl-5β,6β-cyclo-19-nor-Δ$^{9(10)}$-androstene-3β,17β-diol;
17α-ethynyl-5β,6β-cyclo-19-nor-Δ$^{9(10)}$-androstene-3β,17β-diol;
16α-methyl-5β,6β-cyclo-19-Δ$^{9(10)}$-pregnen-3β-ol-20-one;
16β-methyl-5β,6β-cyclo-19-nor-Δ$^{9(10)}$-pregnen-3β-ol-20-one;
16α,17α-isopropylidenedioxy-5β,6β-cyclo-19-nor-Δ$^{9(10)}$-pregnen-3β-ol-20-one;
17,20;20,21-bismethylenedioxy-5β,6β-cyclo-19-nor-Δ$^{9(10)}$-pregnene-3β-ol;
17,20;20,21-bismethylenedioxy-16α-methyl-5β,6β-cyclo-19-nor-Δ$^{9(10)}$-pregnen-3β-ol;
17,20;20,21-bismethylenedioxy-16β-methyl-5β,6β-cyclo-19-nor-Δ$^{9(10)}$-pregnen-3β-ol;
17,20;20,21-bismethylenedioxy-5β,6β-cyclo-19-nor-Δ$^{9(10)}$-pregnene-3β,11β-diol;
17,20;20,21-bismethylenedioxy-5β,6β-cyclo-19-nor-Δ$^{9(10)}$-pregnen-3β-ol-11-one;
17,20;20,21-bismethylenedioxy-16α-methyl-5β,6β-cyclo-19-nor-Δ$^{9(10)}$-pregnene-3β,11β-diol and
17,20;20,21-bismethylenedioxy-16β-methyl-5β,6β-cyclo-19-nor-Δ$^{9(10)}$-pregnen-3β-ol-11-one respectively, where obtained.

*Example IV*

A solution of 0.7 gram of potassium hydroxide in 1 cc. of water and 10 cc. of methanol was added dropwise, with stirring, over a 30 minutes period to a refluxing solution of 1 gram of 5β,6β-cyclo 19-nor-Δ$^{9(10)}$-pregnene-3β,17α-diol-20-one 3,17-diacetate in 30 cc. of methanol; maintained under an inert nitrogen atmosphere. Refluxing was then continuted for two hours more after this addition had been completed. Next, the reaction mixture was cooled to room temperature, neutralized with aqueous acetic acid, and then concentrated under vacuum. The addition of water to the concentrated solution gave a solid precipitate which, upon crystallization from acetone/hexane, gave 5β,6β-cyclo-10-nor-Δ$^{9(10)}$-pregnene-3β,17α-diol-20-one.

By repeating this procedure in every detail but one, namely using 16α-methyl-5β,6β-cyclo-19-nor-Δ$^{9(10)}$-pregnene-3β,17α-diol-20-one 3,17-diacetate as the steroid starting material, the corresponding free hydroxyl compound, 16α-methyl-5β,6β-cyclo-19-nor-Δ$^{9(10)}$ - pregnene - 3β,17α-diol-20-one was obtained.

*Example V*

A mixture of 1 gram of 17,20;20,21-bismethylenedioxy-5β,6β-cyclo-19-nor-Δ$^{9(10)}$-pregnen-3β-ol and 20 cc. of aqueous 60% formic acid was heated for 1 hour on a steam bath. Following this reaction period the reaction mixture was cooled to room temperature and diluted with water. The thus-formed precipitate was collected by filtration, washed with water, dried and then recrystallized from acetone/hexane, thus giving 5β,6β-cyclo-19-nor-Δ$^{9(10)}$-pregnene 3β,17α,21-triol-20-one.

By repeating this procedure in every detail but one, namely, replacing 17,20;20,21-bismethylenedioxy-5β,6β-cyclo-19-nor-Δ$^{9(10)}$-pregnen-3β-ol with 16α,17α-isopropylidenedioxy 5β,6β-cyclo-19-nor-Δ$^{9(10)}$-pregnen-3β-ol-20-one;
16α,17α-isopropylidenedioxy-5β,6β-cyclo-19-nor-Δ$^{9(10)}$-pregnen-3β-ol-20-one 3-acetate;
17,20;20,21-bismethylenedioxy-5β,6β-cyclo-19-nor-Δ$^{9(10)}$-pregnen-3β-ol 3-acetate;
17,20;20,21-bismethylenedioxy-16α-methyl-5β,6β-cyclo-19-nor-Δ$^{9(10)}$-pregnen-3β-ol;
17,20;20,21-bismethylenedioxy-16α-methyl-5β,6β-cyclo-19-nor-Δ$^{9(10)}$-pregnen-3β-ol 3-acetate;
17,20;20,21-bismethylenedioxy-16β-methyl-5β,6β-cyclo-19-nor-Δ$^{9(10)}$-pregnen-3β-ol;
17,20;20,21-bismethylenedioxy-16β-methyl-5β,6β-cyclo-19-nor-Δ$^{9(10)}$-pregnen-3β-ol 3-acetate;
17,20;20,21-bismethylenedioxy-5β,6β-cyclo-19-nor-Δ$^{9(10)}$-pregnene-3β,11β-diol;
17,20;20,21-bismethylenedioxy-5β,6β-cyclo-nor-Δ$^{9(10)}$-pregnene-3β,11β-diol 3-acetate;
17,20;20,21-bismethylenedioxy-5β,6β-cyclo-19-nor-Δ$^{9(10)}$-pregnen-3β-ol-11-one;
17,20;20,21-bismethylenedioxy-5β,6β-cyclo-19-nor-Δ$^{9(10)}$-pregnen-3β-ol-11-one-3-acetate;
17,20;20,21-bismethylenedioxy-16α-methyl-5β,6β-cyclo-19-nor-Δ$^{9(10)}$-pregnene-3β,11β-diol;
17,20;20,21-bismethylenedioxy-16α-methyl-5β,6β-cyclo-19-nor-Δ$^{9(10)}$-pregnene-3β,11β-diol 3-acetate;
17,20;20,21-bismethylenedioxy-16α-methyl-5β,6β-cyclo-19-nor-Δ$^{9(10)}$-pregnen-3β-ol-11-one and
17,20;20,21-bismethylenedioxy-16β-methyl-5β,6β-cyclo-19-nor-Δ$^{9(10)}$-pregnen-3β-ol-11-one 3-acetate respectively, the corresponding unetherified compounds, namely, 5β,6β-cyclo-19-nor-Δ$^{9(10)}$-pregnene-3β,16α,17α-triol-20-one;
5β,6β-cyclo-19-nor-Δ$^{9(10)}$-pregnene-3β,16α,17α-triol-20-one 3-acetate;
5β,6β-cyclo-19-nor-Δ$^{9(10)}$-pregnen-3β,17α,21-triol-20-one 3-acetate;
16α-methyl-5β,6β-cyclo-19-nor-Δ$^{9(10)}$-pregnene-3β,17α,21-triol-20-one;
16α-methyl-5β,6β-cyclo-19-nor-Δ$^{9(10)}$-pregnene-3β,17α,21-triol-20-one 3-acetate;
16β-methyl-5β,6β-cyclo-19-nor-Δ$^{9(10)}$-pregnene-3β,17α,21-triol-20-one;
16β-methyl-5β,6β-cyclo-19-nor-Δ$^{9(10)}$-pregnene-3β,17α,21-triol-20-one 3-acetate;
5β,6β-cyclo-19-nor-Δ$^{9(10)}$-pregnene-3β,11β,17α,21-tetrol-20-one;
5β,6β-cyclo-19-nor-Δ$^{9(10)}$-pregnene-3β,11β,17α,21-tetrol-20-one 3-acetate;
5β,6β-cyclo-19-nor-Δ$^{9(10)}$-pregnene-3β,17α,21-triol-11,20-dione;
5β,6β-cyclo-19-nor-Δ$^{9(10)}$-pregnene-3β,17α,21-triol-11,20-dione 3-acetate;
16α-methyl-5β,6β-cyclo-19-nor-Δ$^{9(10)}$-pregnene-3β,11β,17α,21-tetrol-20-one;
16α-methyl-5β,6β-cyclo-19-nor-Δ$^{9(10)}$-pregnene-3β,11β,17α-21-tetrol-20-one 3-acetate;
16β-methyl-5β,6β-cyclo-19-nor-Δ$^{9(10)}$-pregnene-3β,17α,21-triol-11,20-dione and
16β-methyl-5β,6β-cyclo-19-nor-Δ$^{9(10)}$-pregnene-3β,17α,21-triol-11,20-dione 3-acetate, respectively, were obtained.

*Example VI*

A mixture of 1 gram of 5β,6β-cyclo19-nor-Δ$^{9(10)}$-androsten 3β-ol-17-one, 10 cc. of pyridine and 4 cc. of propionic anhydride was allowed to stand at room temperature overnight, and then poured into ice water. The resulting precipitate was collected by filtration, washed with water and dried. Crystallization from acetone/hexane gave 5β,6β-cyclo-19-nor-Δ$^{9(10)}$-androsten-3β-ol-17-one 3-propionate.

By replacing 5β,6β-cyclo-19-nor-Δ$^{9(10)}$-androsten-3β-ol-17-one with the remaining 5β,6β-cyclo free hydroxyl-containing steroids prepared as described in Examples III, IV and V hereinabove, and using either propionic anhydride, cyclopentylpropionic anhydride, β-chloropropionic anhydride, butyric anhydride, caproic anhydride or enanthic anhydride as the acylating agent, the following esters were obtained:

5β,6β-cyclo-19-nor-Δ$^{9(10)}$-androstene-3β,17β-diol 3,17-dipropionate;
17α-methyl-5β,6β-cyclo-19-nor-Δ$^{9(10)}$-androstene-3β,17β-diol 3,17-dicyclopentylpropionate;
17α-vinyl-5β,6β-cyclo-19-nor-Δ$^{9(10)}$-androstene-3β,17β-diol 3,17-di-β-chloropropionate;
17α-ethynyl-5β,6β-cyclo-19-nor-Δ$^{9(10)}$-androstene-3β,17β-diol 3,17-dibutyrate;
5β,6β-cyclo-19-nor-Δ$^{9(10)}$-pregnen-3β-ol-20-one 3-caproate;
16α-methyl-5β,6β-cyclo-19-nor-Δ$^{9(10)}$-pregnen-3β-ol-20-one 3-enanthate;
16β-methyl-5β,6β-cyclo-19-nor-Δ$^{9(10)}$-pregnene-3β-ol-20-one 3-propionate;
16α,17α-isopropylidenedioxy-5β,6β-cyclo-19-nor-Δ$^{9(10)}$-pregnen-3β-ol-20-one 3-cyclopentylpropionate;
17,20;20,21-bismethylenedioxy-5β,6β-cyclo-19-nor-Δ$^{9(10)}$-pregnen-3β-ol 3-β-chloropropionate;
17,20;20,21-bismethylenedioxy-16α-methyl-5β,6β-cyclo-19-nor-Δ$^{9(10)}$-pregnen-3β-ol 3-butyrate;
17,20;20,21-bismethylenedioxy-16β-methyl-5β,6β-cyclo-19-nor-Δ$^{9(10)}$-pregnen-3β-ol 3-caproate;
17,20;20,21-bismethylenedioxy-5β,6β-cyclo-19-nor-Δ$^{9(10)}$-pregnene-3β,11β-diol 3-enanthate;
17,20;20,21-bismethylenedioxy-5β,6β-cyclo-19-nor-Δ$^{9(10)}$-pregnen-3β-ol-11-one 3-propionate;
17,20;20,21-bismethylenedioxy-16α-methyl-5β,6β-cyclo-19-nor-Δ$^{9(10)}$-pregnene-3β,11β-diol 3-cyclopentylpropionate;
17,20;20,21-bismethylenedioxy-16β-methyl-5β,6β-cyclo-19-nor-Δ$^{9(10)}$-pregnen-3β-ol-11-one 3-β-chloropropionate;
5β,6β-cyclo-19-nor-Δ$^{9(10)}$-pregnene-3β,17α-diol-20-one 3-butyrate;
16α-methyl-5β,6β-cyclo-19-nor-Δ$^{9(10)}$-pregnene-3β,17α-diol-20-one 3-caproate;
5β,6β-cyclo-19-nor-Δ$^{9(10)}$-pregnene-3β,16α,17α-triol-20-one 3,16-dienanthate;
16α-methyl-5β,6β-cyclo-19-nor-Δ$^{9(10)}$-pregnene-3β,17α,21-triol-20-one 3,21-dipropionate;
16β-methyl-5β,6β-cyclo-19-nor-Δ$^{9(10)}$-pregnene-3β,17α,21-triol-20-one 3,21-dicyclopentylpropionate;
5β,6β-cyclo-19-nor-Δ$^{9(10)}$-pregnene-3β,11β,17α,21-tetrol-20-one 3,21-di-β-chloropropionate;
5β,6β-cyclo-19-nor-Δ$^{9(10)}$-pregnene-3β,17α,21-triol-11,20-dione 3,21-dibutyrate;
16α-methyl-5β,6β-cyclo-19-nor-Δ$^{9(10)}$-pregnene-3β,11β,17α,21-tetrol-20-one 3,21-dicaproate and
16β-methyl-5β,6β-cyclo-19-nor-Δ$^{9(10)}$-pregnene-3β,17α,21-triol-11,20-dione 3,21-dienanthate.

*Example VII*

A solution of 2 grams of 5β,6β-cyclo-19-nor-Δ$^{9(10)}$-pregnen-3β-ol-20-one in 4 cc. of pyridine was admixed with 2 cc. of benzoyl chloride and then heated on a steam bath for 1 hour. Following this reaction period the reaction mixture was poured into ice water, and the resulting precipitate collected by filtration, washed with water and dried. Recrystallization from methylene chloride/hexane gave 5β,6β-cyclo-19-nor-Δ$^{9(10)}$-pregnen-3β-ol-20-one 3-benzoate.

It will be obvious to those skilled in the art that other changes and variations can be made in carrying out the present invention without departing from the spirit and scope thereof as defined in the appended claims.

I claim:

1. A process for the preparation of a mixture of a 5β, 6β - cyclo - 19 - nor - Δ$^{9(10)}$-steroid and the corresponding B-homo-19-nor-Δ$^{5(10)}$-steroid-7-ols which comprises contacting a 5,19-cyclo-3β-acyloxy-6α-hydroxy steroid in aqueous medium with a strong acid.

2. A process according to claim 1 wherein said strong acid is a mineral acid.

3. A process according to claim 1 wherein said strong acid is sulfuric acid.

4. A process according to claim 1 wherein said strong acid is hydrofluoric acid.

5. A process according to claim 1 wherein said strong acid is an organic acid.

6. A process according to claim 1 wherein said strong acid is trifluoroacetic acid.

7. A compound represented by the general formula:

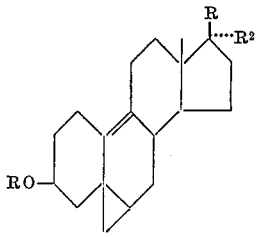

wherein R is selected from the group consisting of hydrogen and a hydrocarbon carboxylic acyl group containing less than 12 carbon atoms; R$^1$ is selected from the group consisting of a hydroxyl group and a hydrocarbon carboxylic acyloxy group containing less than 12 carbon atoms; R$^2$ is selected from the group consisting of hydrogen, lower alkyl, lower alkenyl and lower alkynyl, and R$^1$ and R$^2$ taken together represent a keto group.

8. 5β,6β-cyclo-19-nor-Δ$^{9(10)}$-androsten-3β-ol-17-one.

9. 5β,6β-cyclo-19-nor-Δ$^{9(10)}$-androstene-3β,17β-diol.

10. 17α - methyl - 5β,6β - cyclo - 19 - nor - Δ$^{9(10)}$ - androstene-3β,17β-diol.

11. 17α - vinyl - 5β,6β - cyclo - 19 - nor - Δ$^{9(10)}$ - androstene-3β,17β-diol.

12. 17α - ethynyl - 5β,6β - cyclo - 19 - nor - Δ$^{9(10)}$ - androstene-3β,17β-diol.

13. A compound represented by the general formula:

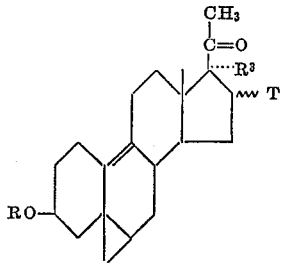

where R is selected from the group consisting of hydrogen and a hydrocarbon carboxylic acyl group containing less than 12 carbon atoms; R$^3$ is selected from the group consisting of hydrogen, a hydroxyl group and a hydrocarbon carboxylic acyloxy group containing less than 12 carbon atoms; T is selected from the group consisting of hydrogen, α-methyl, β-methyl, α-hydroxy and an α-hydrocarbon carboxylic acyloxy group containing less than 12 carbon atoms, and R$^3$ and T taken together represent the grouping:

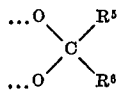

wherein R$^5$ is selected from the group consisting of hydrogen and a lower alkyl group and R$^6$ is selected from the group consisting of hydrogen, a lower alkyl group and an aryl group containing up to 8 carbon atoms, inclusive.

14. 5β,6β-cyclo-19-nor-Δ$^{9(10)}$-pregnen-3β-ol-20-one.

15. 16 - methyl - 5β,6β - cyclo - 19 - nor - Δ$^{9(10)}$ - pregnen-3β-ol-20-one.

16. 16α,17α - isopropylidenedioxy - 5β,6β - cyclo - 19 - nor-Δ$^{9(10)}$-pregnen-3β-ol-20-one.

17. A compound represented by the general formula:

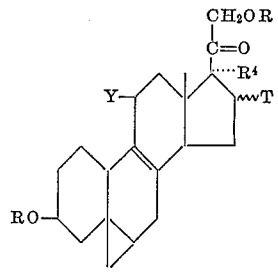

wherein R is selected from the group consisting of hydrogen and a hydrocarbon carboxylic acyl group containing less than 12 carbon atoms; R$^4$ represents a hydroxyl group; T is selected from the group consisting of hydrogen, α-methyl, β-methyl, α-hydroxyl and an α-hydrocarbon carboxylic acyloxy group containing less than 12 carbon atoms; R$^4$ and T taken together represent the grouping:

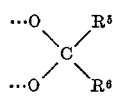

wherein R$^5$ is selected from the group consisting of hydrogen and a lower alkyl group and R$^6$ is selected from the group consisting of hydrogen, a lower alkyl group and an acyl group containing up to 8 carbon atoms, inclusive, and Y is selected from the group consisting of hydrogen, β-hydroxyl and keto.

18. 5β,6β - cyclo - 19 - nor - Δ$^{9(10)}$ - pregnene - 3β,11β, 17α,21-tetrol-20-one.

19. 5β,6β - cyclo - 19 - nor - Δ$^{9(10)}$ - pregnene - 3β,17α, 21-triol-11,20-dione.

20. 16 - methyl - 5β,6β - cyclo - 19 - nor - Δ$^{9(10)}$ - pregnene-3β,11β,17α,21-tetrol-20-one.

21. 16 - methyl - 5β,6β - cyclo - 19 - nor - Δ$^{9(10)}$ - pregnene-3β,17α,21-triol-11,20-dione.

22. A compound of the formula

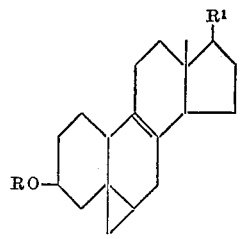

wherein R is selected from the group consisting of hydrogen and lower hydrocarbon carboxylic acyl and R' is selected from the group consisting of hydroxy, lower hydrocarbon carboxylic acyloxy and keto.

No references cited.

LEWIS GOTTS, *Primary Examiner.*

H. FRENCH, *Assistant Examiner.*

UNITED STATES PATENT OFFICE
CERTIFICATE OF CORRECTION

Patent No. 3,354,149                                November 21, 1967

John A. Edwards

It is hereby certified that error appears in the above numbered patent requiring correction and that the said Letters Patent should read as corrected below.

Column 1, lines 32 to 43, for that portion of the formula reading "OR————" read -- RO————--; lines 61 to 72, for that portion of the formula reading $$\begin{array}{c}CH_2CR\\|\end{array} \quad \text{read} \quad \begin{array}{c}CH_2OR\\|\end{array}$$

column 9, lines 20 to 29, for that portion of the formula reading "R" read -- $R^1$ --; column 10, lines 11 to 22, the formula should appear as shown below instead of as in the patent:

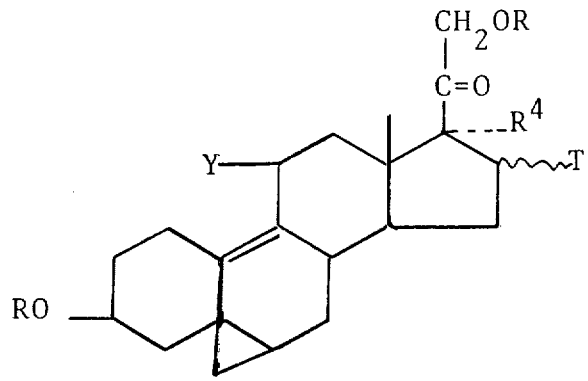

same column 10, lines 53 to 62, the formula should appear as shown below instead of as in the patent:

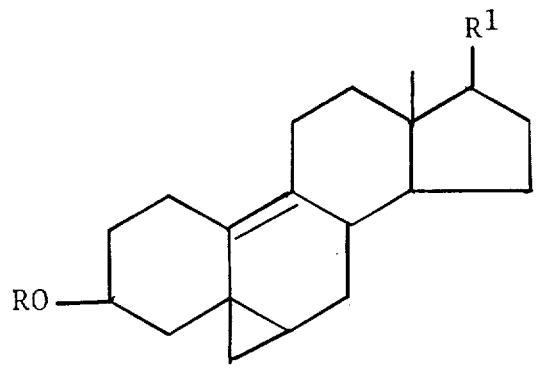

Signed and sealed this 14th day of January 1969.

(SEAL)
Attest:

EDWARD M. FLETCHER, JR.
Attesting Officer

EDWARD J. BRENNER
Commissioner of Patents